Dec. 19, 1939. A. SCHÜTTE 2,184,197
TURBINE DRIVEN BLOWER
Filed March 23, 1938
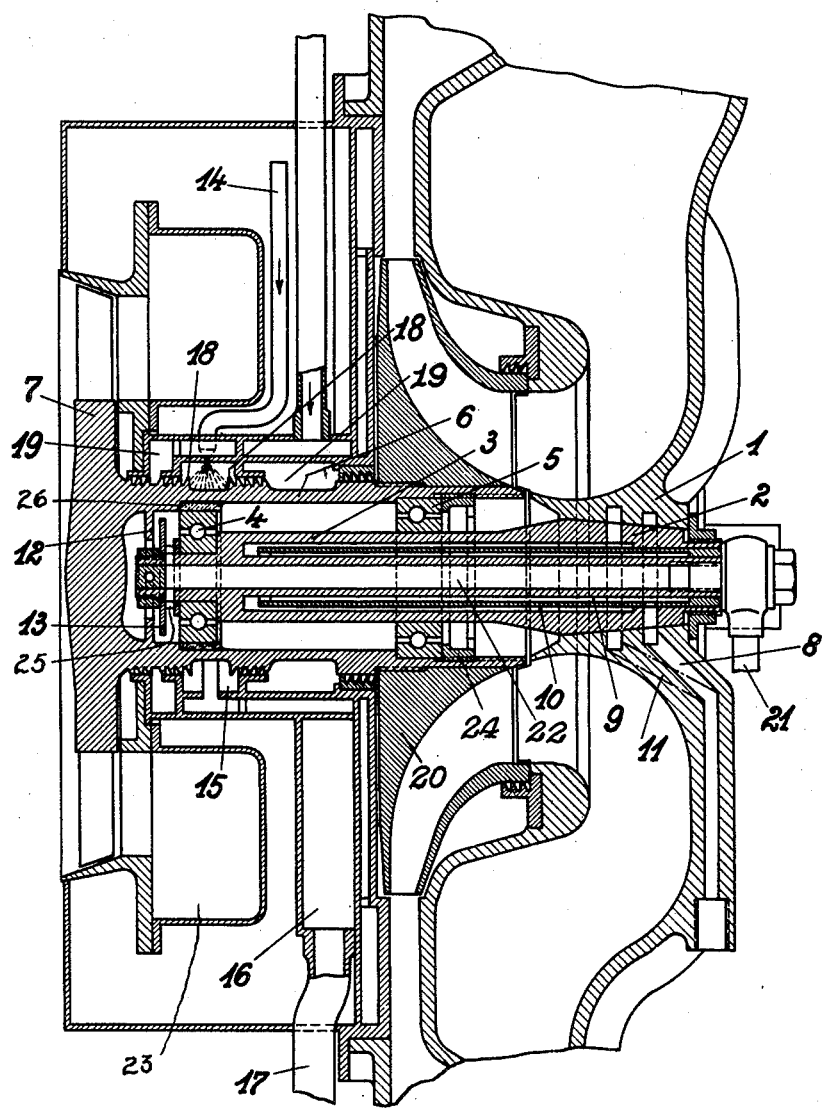
Inventor
Alfred Schütte
by Maréchal + Noe
attys.

Patented Dec. 19, 1939

2,184,197

UNITED STATES PATENT OFFICE 2,184,197

TURBINE DRIVEN BLOWER

Alfred Schütte, Augsburg, Germany, assignor to Maschinenfabrik Augsburg-Nurnberg A. G., Augsburg, Germany, a corporation of Germany Application March 23, 1938, Serial No. 197,618
In Germany March 23, 1937

5 Claims. (Cl. 230—116)

This invention relates to turbine driven blowers.

One object of the invention is the provision of a gas turbine driven blower for blowing or pumping air or other gaseous fluid, the rotatable impeller of the blower being arranged on a hollow shaft which is rotatably mounted by bearings arranged within the shaft and supported on a carrying axle.

Another object of the invention is the provision of a turbine driven blower having a turbine wheel and a blower impeller compactly arranged on a common shaft which is rotatably supported by antifriction bearings arranged within the shaft and carried by a supporting axle which is mounted at one end only in the blower casing.

Another object of the invention is the provision of a turbine driven blower of the character mentioned in which the shaft bearings are adequately protected against the heat of the hot turbine wheel.

Other objects and advantages of the invention will be apparent from the following description, the appended claims and the accompanying drawing.

The drawing is a horizontal central sectional view of a turbine driven blower embodying the present invention, the outer portions of the impeller casing being omitted.

Referring more particularly to the drawing, 1 designates the impeller casing or body member of a blower or pump for handling air or other gaseous fluid used to furnish air under controlled pressure conditions to the internal combustion engine which furnishes the exhaust gases which drive the turbine. This casing provides an axial inlet passage leading to the outwardly curving channels of a rotatable impeller 20 which supplies the air at increased pressure to the discharge pipe of the blower.

In accordance with the present invention the impeller 20 of the blower is fixed to a rotatable shaft 6 which carries a turbine disk 7 on which are turbine blades that are driven by the exhaust gases of an internal combustion engine that are supplied to the annular chamber 23. The power furnished from these exhaust gases operates the shaft 6, and the compressed air supplied from the blower may be used for charging or scavenging internal combustion engine cylinders from which the exhaust gases are furnished, or for any other suitable purpose. The construction of the present invention is particularly applicable to exhaust driven turbine blowers of aircraft or other engines that operate under varying air pressure conditions.

Fixed to the blower casing 1 is a stationary axle 3 which projects into the hollow shaft 6, and which supports the hollow shaft by means of antifriction bearings 4 and 5. The end portion 2 of the axle 3 which is fixed to the blower casing at a point comparatively remote from the turbine disk 7, being arranged in a portion of the blower casing forming a part of the air intake chamber. The bearing 4 is preferably arranged adjacent the end of the axle 3, the inner race of the bearing being fixed to the axle while the outer race of the bearing is axially slidable with respect to the inner surface of the hollow shaft. The outer race of the bearing 5 may be secured to the shaft 6 by a holding sleeve 24 that is removably threaded in the shaft 6, and the inner race of this bearing is suitably secured against axial movement on the outer cylindrical surface of the axle 3. This bearing 5 is arranged within the impeller 20 and is relieved from undue forces since the bearing 4 is comparatively remote from it and is permitted axial movement with respect to the shaft to take care of heat expansion effects.

The turbine disk 7 extends across or closes one end of the passage in the hollow shaft 6, and the bearings provided between the shaft and the axle preferably form the sole supporting means for the turbine disk so that the latter does not require additional support opposite the space into which the exhaust gases are discharged from the turbine blades.

The axle 3, as shown, has an axial passage 22 and annular passages 9 and 10 for the circulation of cooling fluid. Water or other suitable cooling fluid is supplied through the passage 8 in the casing and flows through the channel 9 returning to the channel 10 and flowing out through the passage 11 provided in the blower casing, the cooling fluid being supplied in any suitable manner to maintain a continuous flow during operation. The central passage 22 in the shaft may be supplied with compressed air carrying oil vapor, and serves to cool the bearings 4 and 5 as well as acting for the supply of lubricant, this air and oil vapor being supplied through pipe 21 which is connected to one end of the passage 22, the other end of the passage 22 on the outer side of the antifriction bearing 4 communicating with the interior of the shaft through radially extending openings 25.

The antifriction bearing 4 is protected against heat radiation coming from the hot turbine disk 7 by means of heat protecting plates, a metal plate or disk 12 projecting inwardly from the shaft and a disk 13 projecting outwardly from the end of the axle, and in order to diminish conduction of heat from the turbine disk through the shaft 6 to the outer race of the bearing 4, a bushing 26 of heat-insulating material is provided on the outer bearing race between the latter and the inner surface of the shaft 6.

As a further cooling means for the bearing 4, the outer surface of the shaft 6, as shown, is sprayed with water supplied through pipe 14. At the high speeds of rotation of the shaft the water is thrown off and acts to cool the shaft without substantial vaporization taking place, the spraying water thrown from the shaft being caught in an annular chamber 15 extending around the shaft adjacent the location of the bearing 4. The water flows from the chamber 15 down through the pipe 16 and out through a withdrawal passage 17. At each side of the chamber 15 sealing rings 18 are provided on the shaft for cooperation with the cylindrical walls of chambers 19, the sealing rings 19 and the chambers 19 preventing the loss of water supplied to the chamber 5.

It will now be apparent that the construction affords a compact single-stage blower and single-stage exhaust gas turbine construction in which the parts are compactly arranged and require the minimum of space. The shaft on which the impeller of the blower and the turbine wheel are mounted is comparatively large in diameter and therefore quite rigid, but its rotational momentum is not excessive as the shaft is made hollow. As the bearings are arranged inside of the shaft they may be made comparatively small so as to avoid the difficulties which large diameter bearings offer especially in high speed operation. With a large diameter hollow shaft, a rigid construction is provided but the critical or limiting speed of operation which is determined by the rotational momentum, is very high. Efficiency of operation is also very satisfactory because the space into which the exhaust gas discharges from the turbine blades is unencumbered by bearing supporting structure.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A turbine driven blower of the character described comprising a blower casing, a blower impeller rotatable therein, a hollow shaft fixed to said impeller, an axle fixed on said casing at only one end of said axle and extending through the impeller into said shaft, an antifriction bearing within said shaft closely adjacent said impeller and having inner and outer portions axially fixed respectively to said axle and to said shaft, a second antifriction bearing within said shaft adjacent the unsupported end of said axle and including a bearing race having free axial movement along the shaft, and a gas turbine wheel on said shaft and extending across the end of said shaft.

2. A turbine driven blower of the character described comprising a blower casing, a blower impeller rotatable therein, a hollow shaft fixed to said impeller, an axle supported on said casing at only one end of the axle and extending through the impeller into said shaft, spaced antifriction bearings within said shaft supporting the same on said axle, a turbine wheel closing the end of said shaft adjacent the unsupported end of the axle, means for supplying heated gases to said wheel, and radially overlapping axially spaced plates on the axle and shaft within the end of said shaft for shielding said antifriction bearings against heat radiation from said turbine wheel.

3. A turbine driven blower of the character described comprising a body member, a blower impeller rotatable therein, a hollow shaft fixed to said impeller, an axle supported on said body member and extending into said shaft, bearing means within said shaft rotatably supporting said shaft on said axle, a gas turbine wheel on said shaft, a spray compartment surrounding a portion of said shaft, means in said compartment for spraying cooling water on the outside of said shaft, and a closed chamber on each side of said spraying compartment.

4. A turbine driven blower of the character described comprising a body member, a blower impeller rotatable therein, a hollow shaft fixed to said impeller, an axle supported at only one end thereof on said body member and extending through the impeller into said shaft, antifriction bearing means within said shaft adjacent the end of said axle rotatably supporting said shaft on said axle, a gas turbine wheel on said shaft adjacent the end of said axle, means for supplying cooling water to the outside of said shaft immediately adjacent said antifriction bearing means, and air chambers surrounding said shaft at opposite sides of said water-supplying means.

5. A turbine driven blower of the character described comprising a blower casing, a blower impeller rotatable therein, a hollow shaft fixed to said impeller, an axle fixed on said casing at only one end of the axle and extending through the impeller into said shaft, an antifriction bearing within said shaft within the axial extent of said impeller and having an inner bearing race axially fixed to the axle, means accessible from the end of said shaft adjacent the supported end of the axle for fixing the outer bearing race to the shaft, a second antifriction bearing within said shaft adjacent the unsupported end of the axle and between the shaft and the axle, and a gas turbine wheel for said shaft located outwardly of the unsupported end of said axle and closing the end of the shaft at a point remote from the portion of the casing on which the axle is fixed, said axle and shaft having means for shielding the second antifriction bearing against heat radiation from the turbine wheel.

ALFRED SCHÜTTE.